(12) United States Patent
Ellis et al.

(10) Patent No.: US 7,845,096 B2
(45) Date of Patent: Dec. 7, 2010

(54) SHOE SOLE

(75) Inventors: Eugene N Ellis, Chesterfield, MO (US); Phillip W Pugh, University City, MO (US)

(73) Assignee: Brown Shoe Company, Inc., St. Louis, MO (US)

( * ) Notice: Subject to any disclaimer, the term of this patent is extended or adjusted under 35 U.S.C. 154(b) by 179 days.

(21) Appl. No.: 12/250,786

(22) Filed: Oct. 14, 2008

(65) Prior Publication Data

US 2009/0031589 A1 Feb. 5, 2009

Related U.S. Application Data

(62) Division of application No. 10/544,012, filed as application No. PCT/US2004/002992 on Feb. 4, 2004, now Pat. No. 7,451,511.

(60) Provisional application No. 60/445,210, filed on Feb. 5, 2003.

(51) Int. Cl.
*A43B 23/28* (2006.01)
*A43B 13/18* (2006.01)

(52) U.S. Cl. .......................... 36/59 R; 36/30 R; 36/103; 36/32 R

(58) Field of Classification Search ................ 36/59 R, 36/30 R, 103, 32 R, 25 R, 59 C
See application file for complete search history.

(56) References Cited

U.S. PATENT DOCUMENTS

| | | | |
|---|---|---|---|
| 1,714,026 A * | 5/1929 | Humphries | 428/45 |
| 1,811,803 A | 6/1931 | Oakley | |
| 1,845,008 A * | 2/1932 | Wallace | 36/32 R |
| 1,948,390 A * | 2/1934 | Mebane | 36/32 R |
| 2,844,833 A | 7/1958 | Odermatt | |
| 3,672,077 A | 6/1972 | Coles | |
| 3,844,483 A | 10/1974 | Gray | |
| 3,888,026 A | 6/1975 | Dassler | |
| 4,519,148 A | 5/1985 | Sisco | |
| 6,430,844 B1 | 8/2002 | Otis | |
| 6,571,491 B2 | 6/2003 | Safdeye et al. | |
| 2002/0152638 A1 | 10/2002 | Safdeye et al. | |
| 2003/0009919 A1 | 1/2003 | Stein | |
| 2004/0020080 A1 | 2/2004 | Cox et al. | |

* cited by examiner

*Primary Examiner*—Ted Kavanaugh
(74) *Attorney, Agent, or Firm*—Polster, Lieder Woodruff & Lucchesi, L.C.

(57) ABSTRACT

An outsole for a shoe has a backing member of thermoplastic rubber and on an area of the exterior surface of that backing member an intermediate layer of thermoplastic polyurethane and an outermost layer of fabric, the area comprising at least 51 percent of the contact surface of the outsole. In producing the outsole, a sheet of fabric is overlain with a sheet of thermoplastic urethane, the sheet is heated to about the melting point of the TPU to permit the TPU to adhere to the fabric, and the fabric is cooled. The TPU-covered fabric is cut to the size and shape required to fit a backing member, and position in a mold on a bottom surface of a mold, and a quantity of TPR is injected at a temperature lower than the melting point of the TPU but high enough to render the TPU tacky, to insure the inherence of the TPU-covered fabric to the backing, including the resultant outsole.

5 Claims, 2 Drawing Sheets

SHOE SOLE

CROSS REFERENCE TO RELATED APPLICATIONS

This application is a divisional application of U.S. national phase application Ser. No. 10/544,012 filed Aug. 1, 2005 now U.S. Pat. No. 7,451,511, a national phase application of PCT/US2004/002992, international filing date Feb. 4, 2004, which claims priority of U.S. Provisional Patent Application No. 60/445,210, filed Feb. 5, 2003.

STATEMENT REGARDING FEDERALLY SPONSORED RESEARCH OR DEVELOPMENT

Not Applicable

BACKGROUND OF THE INVENTION

Due to the vagaries of the U.S. tariff schedules, it has become important to produce, import, and sell shoes in which the sole presents a certain percentage, presently at least 51 percent, of fabric that contacts the ground (See U.S. Patent Application Publication No. US-2002-0152638-A1, published Oct. 24, 2002.) A number of recent patents and patent applications directed to shoes or shoe soles meeting the requirements of the Tariff Schedules for reduced tariffs have issued or been published. The broad idea of a fabric or a felt insert on an outsole is old, see Walters U.S. Pat. No. 3,844,483 (1888). Even a fabric insert with a rubber backing has been patented, see Oakley U.S. Pat. No. 1,811,803 (1931). More recent patents and applications include Otis U.S. Pat. No. 6,430,844 (2002), and Safdeye et al. U.S. Pat. No. 6,571,491 (2003). So far as applicants are aware, the only recent patent application that has acknowledged the real reason for the flurry of activity in this area is U.S. 2002-0152638-A1, published Oct. 24, 2002.

The present invention has to do with improvements in an outsole in which a fabric insert is secured, and method of producing it.

BRIEF SUMMARY OF THE INVENTION

In accordance with this invention, generally stated, an outsole for a shoe comprises a backing member of thermoplastic rubber (TPR), an area of the exterior surface of the backing member having an intermediate layer of thermoplastic urethane (TPU) and an outermost layer of fabric, the area being of a size that permits classification under the Harmonized Tariff Schedule at a tariff rate lower than that of a shoe having no ground-engaging fabric, presently at least 51 percent of the contact surface of the outsole. The outsole is produced by covering a sheet of fabric, preferably non-woven fabric, with TPU by overlaying the fabric with a sheet of TPU, heating said TPU sheet to about the melting point of the TPU to permit the TPU to adhere to the fabric; cutting the TPU-covered fabric to the size and shape required to fit a backing member to which the covered fabric is to be attached; positioning the cut, covered fabric on a bottom surface of a mold, and injecting into the mold a quantity of TPR at a temperature lower than the melting point of the TPU but high enough to render the TPR tacky, and cooling the resultant outsole. In the preferred embodiment, the side of a non-woven fabric that is to be exposed, i.e. the side opposite the overlain side, is layered with solvent dissolved TPU before the fabric is overlain with the TPU. The layering is done at about 150° Celsius, and, preferably, in three passes. Also, preferably, holes are formed in the fabric, through which the TPR is forced to a controlled distance, generally around 1/32".

BRIEF DESCRIPTION OF THE SEVERAL VIEWS OF THE DRAWINGS

Corresponding reference characters indicate corresponding parts throughout the several views of the drawings.

DETAILED DESCRIPTION OF INVENTION

Figure 1:
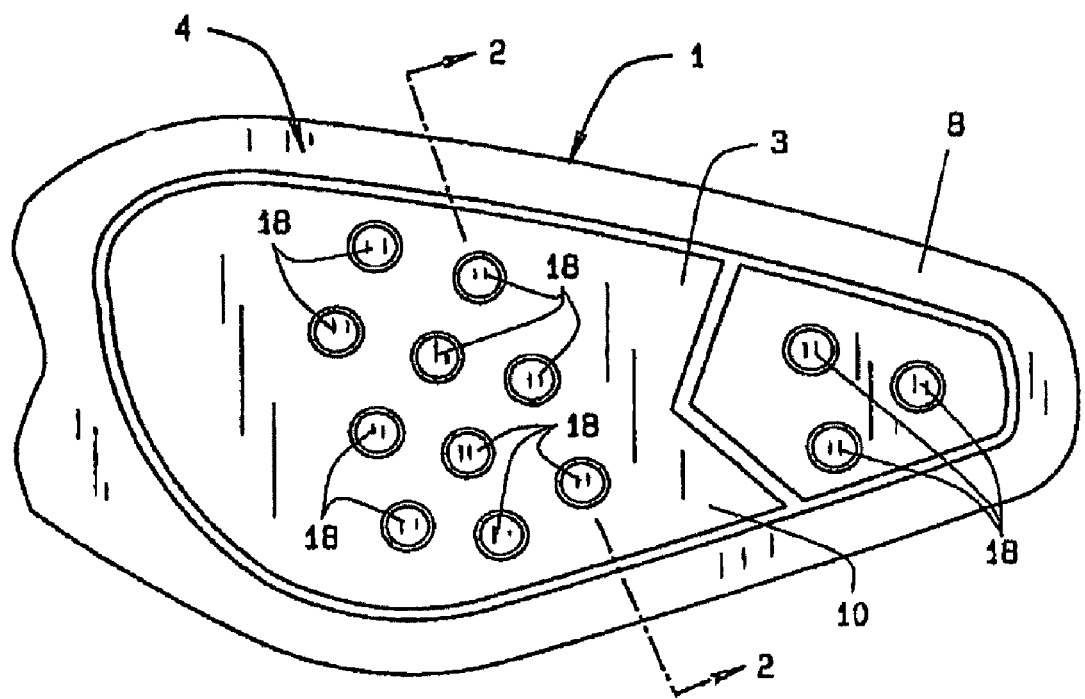
FIG. 1 is a view in plan of the part of an outsole of this invention that contacts the ground.
Figure 2:
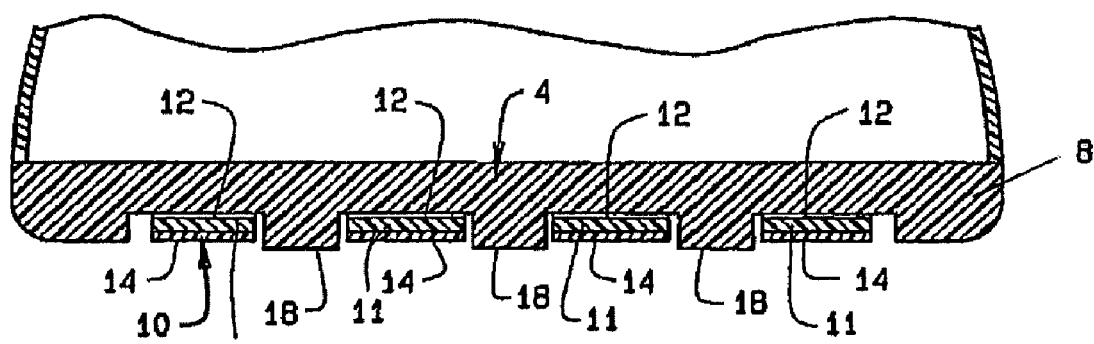
FIG. 2 is a sectional view, taken along the line 2-2 of FIG. 1.
Figure 3:
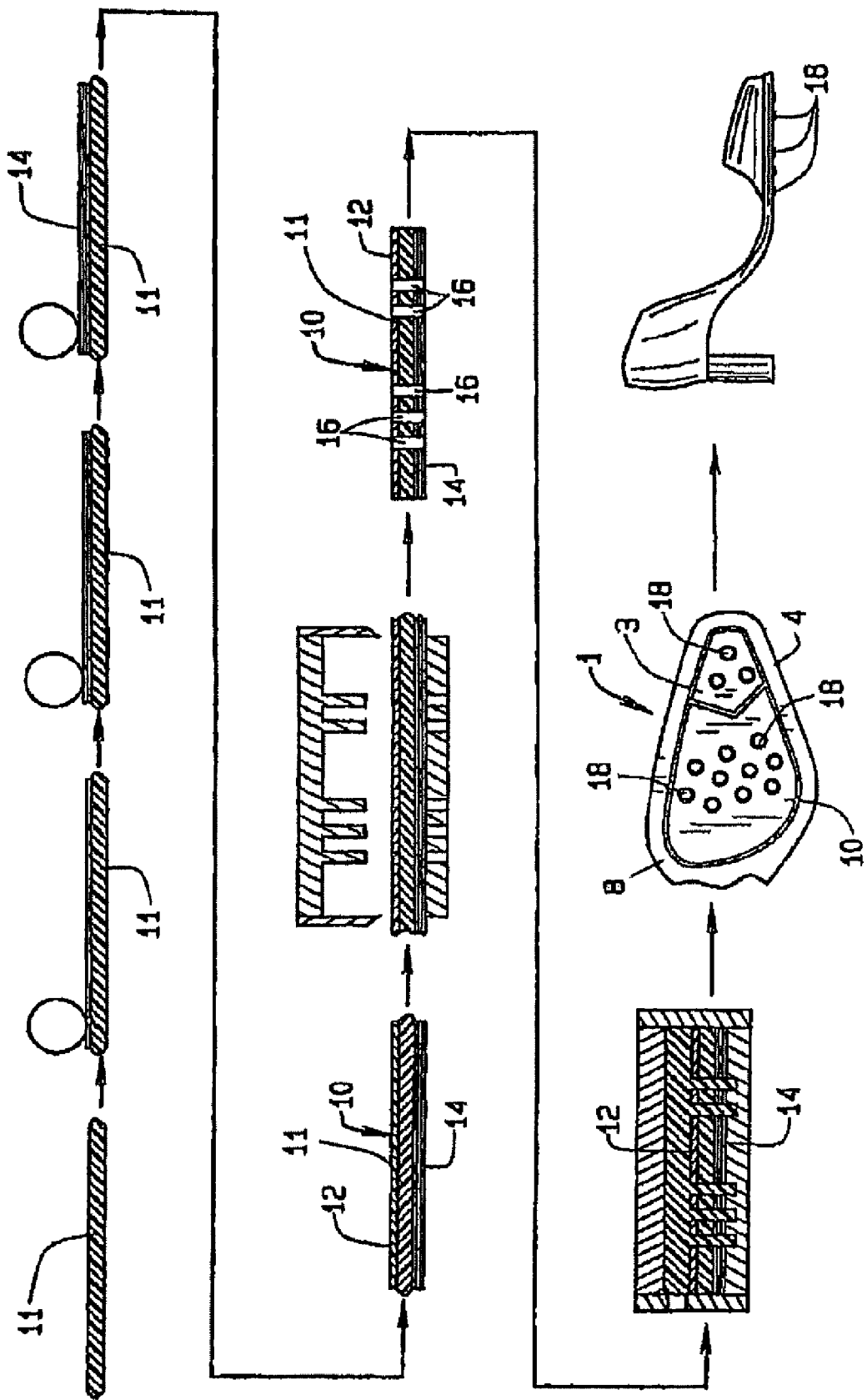
FIG. 3 is a schematic view showing the steps in making the embodiment of sole shown in FIG. 1.

Referring now to the drawings for one illustrative embodiment of outsole of this invention, reference numeral 1 indicates an outsole that includes an outsole-forming backing member 8 made of thermoplastic rubber (TPR) and a fabric insert 10 disposed within an insert backing region 4 of the backing member 8 such that a ground contacting surface of the outsole includes a fabric ground contacting area 3. In this embodiment, the fabric insert 10 comprises a non-woven fabric, and the fabric ground contacting area 3 is of a size that permits classification of a shoe including the outsole 1 under the Harmonized Tariff Schedule at a tariff rate lower than that of a shoe having an outsole with no ground-engaging fabric, presently at least 51 percent of the ground contacting surface of the outsole 1. The fabric ground contacting area 3 comprises a portion of the insert backing region 4 of the outsole TPR backing member 8, and the non-woven fabric insert 10 that is integrally formed with the TPR backing member 8 of the outsole 1. The fabric insert 10 includes a non-woven fabric base layer 11 that generally has a thickness on the order of 0.8 millimeters, but can vary, depending upon the availability of the fabric and the type of shoe to which the outsole 1 is to be applied. Its exact thickness is not critical. Fabric insert 10 further includes an intermediate layer 12 of thermoplastic polyurethane (TPU) adhered to an inner surface of the fabric base layer 11 and an outer layer of material 14 formed on an outermost exterior surface of the fabric base layer 11. In this preferred embodiment, the fabric insert 10 is provided with holes 16, through which protrusion projecting from the backing member 8 within the insert backing region 4 extend and protrude a carefully predetermined distance, on the order of 1/32", to form protruding islands 18 on the outer surface of the fabric insert 10.

In this, preferred embodiment, the outsole 1 is produced by treating the exterior surface of a sheet of non-woven fabric, e.g., fabric base layer 11, with a solution of soluble TPU (see, for example Estane®, a product of Noveon) in methyl ethyl ketone (MEK) and dimethyl formamide (DMF), in three passes, at about 150° C. to form a very thin skin, e.g. the outer layer 14, on the order of 0.2 mm thick, for example, on the external or contact side of the sheet of fabric. Then, an inner, opposite side of the treated sheet of fabric is covered with TPU, e.g., intermediate layer 12, by overlaying the sheet of fabric with a sheet of TPU and heating the TPU sheet to the about the melting point of the TPU, around 150° C. to permit the TPU to adhere to the sheet of fabric. Next, inserts, e.g., fabric inserts 10, are cut from the TPU covered sheet of fabric to have size and shape required to fit within the insert backing region 4 of the TPR backing member 8 to which the fabric insert 10 is to be attached. Substantially, simultaneously holes 16, having a diameter of about 6-8 mm are punched in the fabric insert 10 in a predetermined pattern. Subsequently, the surface of the TPU can be scrubbed with solvent to promote adhesion. Next, the covered, cut, punched, and scrubbed fabric insert 10 is positioned, contact (treated) side down, on a bottom surface of a mold. Thereafter, a quantity of TPR at a temperature lower than the melting point of the TPU but high enough to render the TPU tacky is injected into the mold to form the outsole 1. Finally, the resultant outsole 1 is cooled sufficiently to permit its removal from the mold, and the resultant outsole 1 is removed from the mold. In the preferred embodiment, the TPR is injected into the mold at a pressure of 18-20 kg, over about three seconds at a temperature in the mold of 74°-79° C., with a dwell time of 2.5 to 3.0 seconds and a pressure in the mold, once injection is complete, of 30-35 kg. In the preferred embodiment, in which holes 16 are punched in the fabric insert 10, the upper surface of the bottom of the mold has shallow depressions, positioned complementarily to the holes 16 in the fabric insert 10, to limit the protrusion of the islands 18 and to give them a finished form. Preferably, the mold is Teflon (polytetrafluoroethylene) coated, to facilitate removal of the outsole 1 and to minimize pilling of the fabric insert 10.

Numerous variations in the construction of the outsole 1 of this invention and the method of making it, within the scope of the appended claims, will occur to those skilled in the art in the light of the above description. For example, the various dimensions given can and will vary, depending upon the shoes for which the outsole 1 is intended, and manufacturing tolerances. The size of the holes 16 in the fabric insert 10 can be varied, as long as the amount of area the resultant islands cover does not cause the effective fabric contact area to be less than the percentage required by the tariff schedule. The TPR can be compounded to be somewhat tackier than ordinary TPR at the temperature at which it bonds with the TPU, but not tacky at temperatures to which it is exposed as an outsole of a shoe. The outsole 1 can be made without the holes 16 in the fabric insert 10 or with an entirely different pattern of holes 16 from that shown in the drawings, and can even be made without the outer coating 14 on the outer surface of the fabric base layer 11, although that coating is much preferred. A heavy woven fabric can be used instead of the non-woven fabric for the fabric. These variations are merely illustrative.

The invention claimed is:

1. An outsole for a shoe comprising:
   an outsole-forming backing member made of TPR, said backing member providing a portion of a ground contacting surface of said outsole and including an insert backing region formed within an interior area of said backing member, said insert backing region comprising a plurality of protrusions that provide another portion of said ground contacting surface of said outsole; and
   a fabric insert disposed within said insert backing region of said backing member to provide a fabric contact area of said ground contacting surface of said outsole, said insert comprising:
   a base layer made of a fabric;
   an intermediate layer adhered to an innermost surface of said base layer and to said backing portion of said backing member, said intermediate layer made of TPU;
   an outer layer, formed on an exposed outermost surface of said base layer, said outer layer comprising a dried coating of soluble TPU on the order of 0.2 mm thick; and
   a plurality holes through which said protrusions of said backing member extend and project beyond said outer layer of said fabric insert,
   said fabric insert sized such that said fabric contact area provides a particular amount of said ground contacting surface of said outsole such that a shoe including said outsole can be classified under the Harmonized Tariff Schedule to incur a tariff rate lower than a shoe having an outsole having no fabric contact area or a shoe having an outsole having a fabric ground contact area that is not sufficiently sized to permit such classification.

2. The outsole of claim 1 wherein said fabric insert is sized such that said fabric contact area is at least 51% of the ground contacting surface.

3. The outsole of claim 1 wherein the fabric base layer comprises a non-woven fabric.

4. The outsole of claim 1 wherein the holes are about 6-8 mm in diameter.

5. The outsole of claim 1 wherein the protrusions project about 0.8 mm beyond said outer layer of said insert.

* * * * *